(12) United States Patent
Fultz et al.

(10) Patent No.: US 7,823,192 B1
(45) Date of Patent: Oct. 26, 2010

(54) APPLICATION-TO-APPLICATION SECURITY IN ENTERPRISE SECURITY SERVICES

(75) Inventors: David Fultz, Raymore, MO (US); Alan Hsin, Overland Park, KS (US); Shrikant Jannu, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1139 days.

(21) Appl. No.: 10/815,518

(22) Filed: Apr. 1, 2004

(51) Int. Cl.
H04L 9/32 (2006.01)

(52) U.S. Cl. .............. 726/7; 726/2; 726/4; 726/5; 726/6; 726/18; 726/29; 713/151; 713/152; 713/155; 713/182; 713/185; 709/225; 709/229

(58) Field of Classification Search .......... 713/152, 713/155, 167, 168, 170, 189, 183, 185; 726/1, 726/2, 17, 21, 6, 18, 28, 29, 30, 26; 709/229, 709/225
See application file for complete search history.

(56) References Cited

U.S. PATENT DOCUMENTS

| | | | | |
|---|---|---|---|---|
| 5,604,490 A * | 2/1997 | Blakley et al. | .................. | 726/5 |
| 5,974,566 A * | 10/1999 | Ault et al. | ...................... | 714/15 |
| 6,681,330 B2 * | 1/2004 | Bradford et al. | ............... | 726/3 |
| 6,775,783 B1 * | 8/2004 | Trostle | .......................... | 726/6 |
| 6,928,469 B1 * | 8/2005 | Duursma et al. | ............ | 709/223 |
| 7,020,645 B2 * | 3/2006 | Bisbee et al. | ...................... | 1/1 |
| 7,178,150 B1 * | 2/2007 | Ahmad et al. | ............... | 719/313 |
| 7,178,163 B2 * | 2/2007 | Reeves, Jr. | ...................... | 726/2 |
| 7,197,712 B2 * | 3/2007 | Muehlhausen | .............. | 715/743 |
| 7,209,970 B1 * | 4/2007 | Everson et al. | .............. | 709/229 |
| 7,216,225 B2 * | 5/2007 | Haviv et al. | .................. | 713/152 |
| 7,249,375 B2 * | 7/2007 | Bhatia et al. | ...................... | 726/8 |
| 7,313,812 B2 * | 12/2007 | Robinson et al. | ............... | 726/1 |
| 7,334,254 B1 * | 2/2008 | Boydstun et al. | ............... | 726/2 |
| 7,363,487 B2 * | 4/2008 | Venkataramappa et al. | . | 713/150 |
| 7,424,608 B1 * | 9/2008 | Cherukumudi et al. | ...... | 713/156 |
| 7,444,519 B2 * | 10/2008 | Laferriere et al. | ........... | 713/185 |
| 2003/0033535 A1 * | 2/2003 | Fisher et al. | ................. | 713/185 |
| 2003/0074580 A1 * | 4/2003 | Knouse et al. | .............. | 713/201 |
| 2003/0097574 A1 * | 5/2003 | Upton | ......................... | 713/183 |
| 2003/0135628 A1 * | 7/2003 | Fletcher et al. | ............. | 709/229 |
| 2003/0200465 A1 * | 10/2003 | Bhat et al. | ................... | 713/202 |
| 2004/0059941 A1 * | 3/2004 | Hardman et al. | ............ | 713/201 |
| 2004/0088349 A1 * | 5/2004 | Beck et al. | ................... | 709/203 |
| 2004/0098595 A1 * | 5/2004 | Aupperle et al. | ............ | 713/185 |
| 2004/0098609 A1 * | 5/2004 | Bracewell et al. | ........... | 713/200 |
| 2004/0117615 A1 * | 6/2004 | O'Donnell et al. | .......... | 713/155 |
| 2004/0139319 A1 * | 7/2004 | Favazza et al. | .............. | 713/168 |

(Continued)

Primary Examiner—Nasser Moazzami
Assistant Examiner—Shanto M Abedin (57) ABSTRACT

The present system allows disparate secure applications to communicate directly with one another in a heterogeneous application environment by providing for the creation of tokens that can be passed between the applications without human intervention. Security information is passed between applications in the form of a token with a string data type. Since a string is a primitive data type, it can be recognized by a large number of applications and interfaces. The token has no header and therefore no application-specific header configuration, making it platform and technology independent. This eliminates the need for conversion of security information between different formats. The use of tokens also eliminates the need for an application to be authenticated and authorized every time it sends a message to another application. Instead of a permanent context or session, a context is created with every invocation from one application to another.

32 Claims, 2 Drawing Sheets

U.S. PATENT DOCUMENTS

2005/0108521 A1* 5/2005 Silhavy et al. .............. 713/156
2005/0188212 A1* 8/2005 Laferriere et al. ........... 713/185
2006/0174334 A1* 8/2006 Perlin et al. .................... 726/9

* cited by examiner

APPLICATION-TO-APPLICATION SECURITY IN ENTERPRISE SECURITY SERVICES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to the transmission of security information between disparate computing applications. More particularly, embodiments of the present invention provide for the passing of tokens among disparate applications in order to transmit security credentials.

BACKGROUND OF THE INVENTION

In a web environment, a user might need to gain access to multiple secure web sites. To do so, the user typically enters a user ID and password at a first web site and, upon validation of the ID and password, is admitted to the site. At this point, a token can be created that authenticates the identity of the user and authorizes the user to gain access to certain other secure web sites. If the user subsequently attempts to reach another secure web site that recognizes the token, the user would not be required to enter the ID and password again. Instead, the token is passed to the web site and, if the token is found to be valid, the user is automatically granted access based on information provided by the token. Such an arrangement can allow a user to move seamlessly among secure web sites without being aware of the passing of the token that is occurring in the background.

A similar approach can be used in an application environment when a user wishes to gain access to multiple secure applications. When the user signs on to a secure application, a token for the user can be created that allows the user to be automatically signed on to other secure applications that recognize the token. In a single sign-on arrangement such as this, when the user switches from one application to another, the token is automatically passed to the appropriate application. As an example, upon the user signing on to a secure J2EE application, a token might be created that verifies the user's identity and allows the user to be automatically signed on to a secure CORBA application. If the user switches from the J2EE application to the CORBA application, the token is automatically passed from the J2EE application to the CORBA application, which then reads the token and, if the token is valid, allows the user access.

In either of these approaches, the creation and passing of tokens is typically handled by proprietary, off-the-shelf authentication and authorization products that are specific to the applications in question. For example, in the case of the web environment, an authentication and authorization product residing in a web server might hide the user token in a session of a web browser. The token might take the form of a cluster of security information that is passed from one web site to another. The web sites themselves might not be aware of the contents of the cluster. Upon receiving a token, a web site would merely confirm its authenticity with the authentication and authorization product. Only the authentication and authorization product would have access to the contents of the cluster so that it would have the ability to create and verify the security information.

In a situation where multiple instances of a single type of application need to communicate with one another without human intervention, a token might not be used. For example, in a homogeneous environment of multiple J2EE applications, the first time one application calls another, the calling application, or client, might present credentials, such as an ID and password, to the called application, or server. The server checks the client's credentials and determines if the client is authorized to make the requested call.

Upon approval of the credentials, the server accepts the call. A context might then be created for further point-to-point communication between the two applications. On subsequent requests, the server can check the context, or container, to ensure that the client is authorized to communicate with the server. Thus, a connection between the two similar applications can remain open without the need for the client to present credentials with each call to the server.

In each of these situations, a user accessing multiple secure web sites in a web environment, a user accessing multiple secure applications in a heterogeneous application environment, and an application accessing another instance of the same application in a homogeneous application environment, a mechanism exists by which identifying information for a user or an application is presented only upon the first attempt by the user or the application to gain access to a secure web site or a secure application. Upon subsequent attempts, the mechanism automatically allows legitimate users or applications to have access to the secure web site or the secure application without the further presentation of credentials. However, other situations exist that require additional capability and functionality. For example, disparate secure applications may need to communicate directly with one another in a heterogeneous application environment.

SUMMARY OF THE INVENTION

An embodiment of the invention is a system for providing application-to-application enterprise security. The system consists of a security application program interface, an authentication authority, a store maintaining data, an application program interface, and a server application. The security application program interface is coupled to a client application to provide a security credential. The authentication authority receives the security credential from the security application program interface and, if the security credential is valid, it generates a token and communicates the token to the security application program interface. The store maintaining the data, which is in communication with the authentication authority, validates the security credential. The application program interface is coupled to the client application and can communicate regarding the token. The server application receives the token from the application program interface and communicates with the authentication authority to validate the token to enable the client application to use services of the server application.

The server application can consist of an application program interface to communicate with the application program interface of the client application and a security application program interface to communicate with the authentication authority. The server application can cache the token after validating the token with the authentication authority so that when the client application requests service of the server application, via the application program interfaces of the client application, the server application uses the cached token to validate the client application.

The token generated by the authentication authority can consist of a string including at least a portion of the security credential. At least a portion of the token can be in Extensible Markup Language format or in Security Assertion Markup Language format. The token can include information related to its expiration date. Validating the token by the authentication authority can include determining whether the authentication authority created the token.

An alternative embodiment is a method for providing application-to-application enterprise security. The method consists of communicating a security credential from a client application to an authentication authority and communicating information related to the security credential between the authentication authority and a data store to determine whether the security credential is valid. The method provides for generating a token by the authentication authority when the security credential is valid and communicating the token to the client application. The client application provides the token to a server application, and the server application validates the token before providing access to its services.

The server application is provided with a security application program interface to validate the token with the authentication authority. The client application is provided with an application program interface to communicate the token to an application program interface of the server application. Validating the token by the server application can consist of communicating information related to the token to the authentication authority, the authentication authority determining whether the token is authentic, and receiving validation-related information from the authentication authority.

The information related to the token can be the token itself or a portion of the data comprising the token. The authentication authority can validate the token by determining whether the authentication authority generated the token. The authentication authority can also determine whether the token has expired. The token can include a portion of the security credential in a string format and can include information related to its expiration date. The token can also be encrypted. The string format of the token can be in an Extensible Markup Language format or a Security Assertion Markup Language format.

The client application can further include an application program interface for communicating with the server application and a security application program interface for communicating with the authentication authority. The security credential can be defined as including a password and user identification. The security credential can further be defined as being encrypted and the data store can further be defined as a data store maintaining user identifications and passwords. Alternatively, the security credential can be an X.509 certificate and the data store can be a certificate authority. In this case, the X.509 certificate can be communicated from the authentication authority to the certificate authority, the X.509 certificate can be validated by the certificate authority, and validation information can be communicated to the authentication authority.

Another alternative embodiment is a system to provide application-to-application enterprise security. The system consists of a first security application program interface coupled to a first application to provide a first security credential, a second security application program interface coupled to a second application to provide a second security credential, an authentication authority, a store maintaining data, and a first and a second application program interface.

The authentication authority can receive the first and second security credentials from the first and second security application program interfaces. If the first and second security credentials are valid, the authentication authority can generate tokens and communicate the tokens to the first and second security application program interfaces. The store maintaining the data can validate the first and second security credentials through communication with the authentication authority. The first application program interface is coupled to the first client application and can communicate regarding tokens. The second application program interface is coupled to the second client application and can receive the token from the first application program interface. The second security application program interface can communicate with the authentication authority to validate the token to enable the first application to use services of the second application. The second application program can receive the token from the second application program interface and the first security application program interface can communicate with the authentication authority to validate the token to enable the second application to use services of the first application.

The tokens generated by the authentication authority can be defined as a first token generated by the authentication authority for the first application based on the first security credential and a second token generated by the authentication authority for the second application based on the second security credential. The first and second tokens can further be defined as data provided in a string format including portions of the first and second security credentials, respectively. The tokens can include an expiration date. The string format of the tokens can further be defined as Extensible Markup Language format or as Security Assertion Markup Language format.

DETAILED DESCRIPTION OF THE PREFERRED EMBODIMENTS

The present system allows disparate secure applications to communicate directly with one another in a heterogeneous application environment by providing for the creation of tokens that can be passed between disparate applications without human intervention.

With existing technology, security information passed between disparate secure applications typically must be converted from the format of one application to the format of another application. Every application typically has its own format for sending messages, which typically include a header and a body. The body typically contains the message itself while the header typically contains information about the message such as the size, source, and destination of the message. Security information about the sender of the message can be included in the header.

In the case of a homogeneous environment of multiple instances of the same application, all messages are sent in a common format that each application can recognize. In a heterogeneous environment of disparate applications, however, one application typically cannot recognize the format of the messages from another application. Thus, in order for security information to be passed from one application to another, the header would have to be converted from the format of one application to the format of the other application. If multiple disparate applications were present, a converter would be needed between every possible combination of different applications. The labor and expense needed to create and implement a large number of converters could be significant.

In addition, it would typically be necessary for a client to present a server with security credentials every time a message is passed from the client to the server. The server would then need to authenticate and authorize the client every time the server received a message from the client. Repetitious transmission and validation of security information such as this can be cumbersome and time-consuming.

The present system allows tokens to be passed among disparate applications so that security information can automatically be included with each call from one application to another. This eliminates the need for conversion of security information in message headers between the data formats of the applications. It also eliminates the need for an application to be authenticated and authorized every time it sends a message to another application. In contrast with services where a security context remains present on a server, in embodiments of the invention there is no permanent context or session. Instead, a context is created with every invocation from one application to another.

Rather than security information being converted from the format of one platform to the format of another, security information is passed between applications in the form of a token with a string data type. Since a string is a primitive data type, it can be recognized by a large number of applications and interfaces, meaning it can be sent over multiple services such as J2EE, CORBA, and IBM's MQSeries. Making the token a string makes it platform and technology independent because the token has no header and therefore no application-specific header configuration.

The stringified token is typically placed in an XML document because of the portability and flexibility of XML. Numerous applications, including J2EE, CORBA, and MQSeries, can transmit, receive, and parse XML documents. Also, XML has intrinsic methods for creating standard strings of data. In other embodiments, other formats that provide for the creation and transmission of data in a similar manner could be used. For example, when a higher level of transmission security is needed, Security Assertion Markup Language (SAML) could be used.

An application sending a message to another application or invoking a method on another application can be referred to as a client. An application receiving a message or a method invocation from another application can be referred to as a server. In an embodiment, the first time a client application makes an invocation to a server application, the client sends a set of security credentials to a central authentication and validation authority. In one embodiment, the credentials can consist of an application ID and a password. In another embodiment, the credentials can be a digital certificate conforming to the X.509 standard or a similar standard.

The central authentication and validation authority authenticates the client by verifying the security credentials. In the case of an ID and password, the verification can consist of confirming that the password is valid for the ID. For an X.509 certificate, verification might include determining whether the certificate is trusted, ensuring that the certificate has not expired or been revoked, and determining whether the digital signature within the certificate is valid. If the security credentials indicate that the application is authentic, the central authentication and validation authority creates a token containing a stringified version of the credentials and returns the token to the client.

The security credentials are checked for validity only at the initial authentication of a client. That is, once a token for a client has been created in this manner, the client no longer needs to present its password or certificate when making an invocation. The token with the stringified version of the credentials is automatically included with any invocation the client makes to a server. The token remains in effect until it reaches an expiration date.

Upon receiving a token, a server consults the central authentication and validation authority to verify that the token is valid. Validation can include verifying that the central authentication and validation authority created the token and that the token has not expired.

Upon receiving validation of the token from the central authentication and validation authority, the server determines whether the client is authorized to make the requested invocation. If the client is authorized, the server accepts the invocation from the client.

The above discussion has described the clients and servers sending security information directly to each other and directly to the central authentication and validation authority. However, in a typical embodiment, security information instead might be transmitted by a set of application programming interfaces (APIs) coupled to the client and server applications. The platform-independent APIs can send and receive the tokens and extract the necessary security information from the tokens. The APIs can communicate with the applications in the native formats of the applications.

With the APIs handling the communication of security information, a client would not need to be aware that a token has been added to an invocation it has sent and a server would not need to be aware that an invocation it has received includes a token. Client applications and server applications could operate in their normal manner without the need for any modifications.

In an embodiment, a set of two APIs can be placed in front of each application to handle the communications among the applications and between each application and the central authentication and validation authority. One API, which can be referred to as a security API, sends security credentials from a client to the central authentication and validation authority and receives a token from the central authentication and validation authority. When an application is acting as a server, the security API on the application sends a token received from a client to the central authentication and validation authority for validation. The security API on a server then receives validation of the token from the central authentication and validation authority.

The other API on each server can be referred to as an application API. The application APIs send and receive invocations and tokens between applications. The application API on a client sends an invocation and a token to the application API on a server. Upon receiving the token, the application API on the server extracts identifying information about the client from the token and determines if the client is authorized to make the requested invocation. If the client is authorized, the application API on the server accepts the invocation from the application API on the client.

Figure 1:
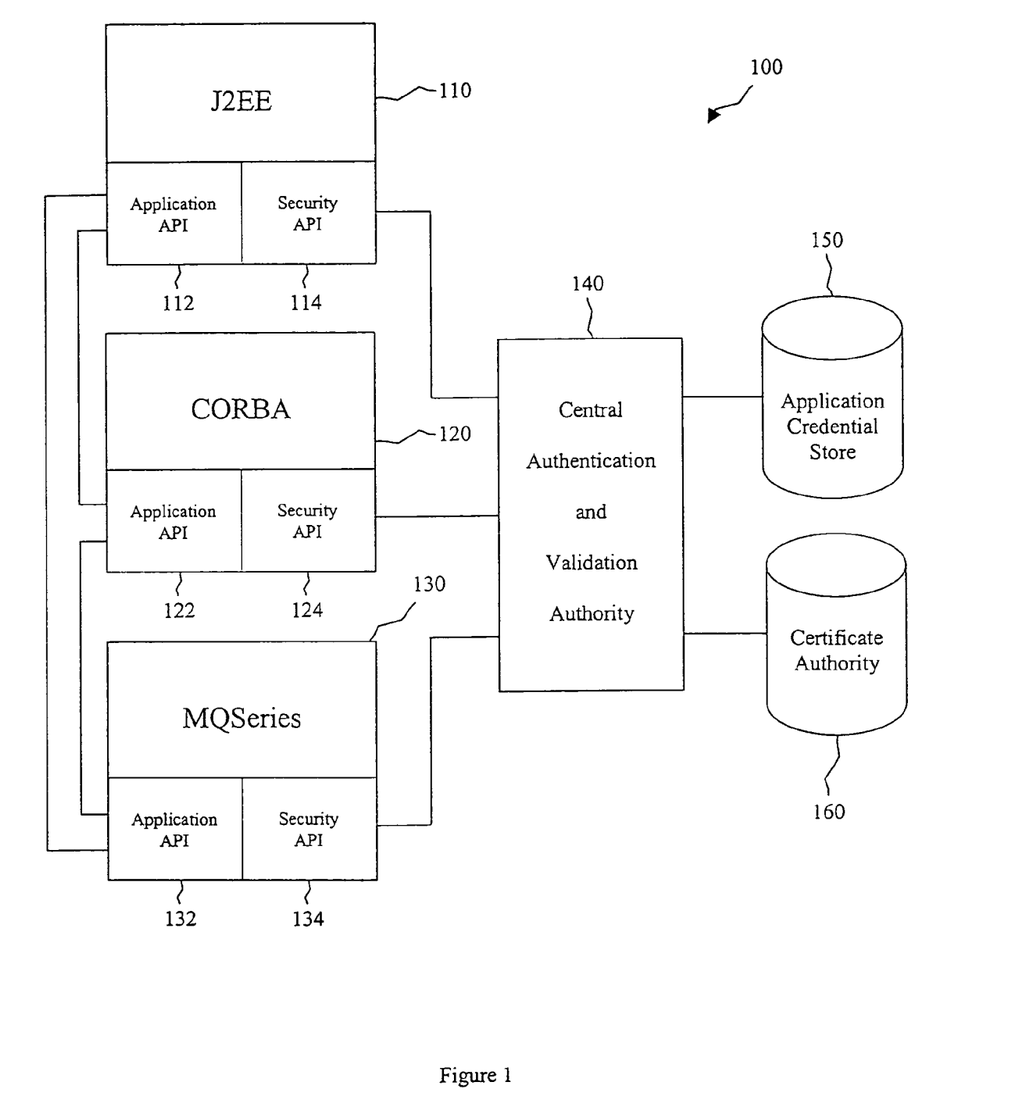
FIG. 1 is a block diagram of an application-to-application security system according to one embodiment.

FIG. 1 illustrates a system 100 in which application-to-application security could be implemented. In this embodiment, three applications are shown, a J2EE application 110, a CORBA application 120, and an MQSeries application 130. In other embodiments, other types and numbers of applications could be present. Each application is coupled to an application API and a security API that are customized for the application to which they are coupled. That is, a J2EE application API 112 and a J2EE security API 114 are coupled to the J2EE application 110, a CORBA application API 122 and a CORBA security API 124 are coupled to the CORBA application 120, and an MQSeries application API 132 and an MQSeries security API 134 are coupled to the MQSeries application 130.

The security API for each application is coupled to a central authentication and validation authority 140 and the central authentication and validation authority 140 is coupled to an application credential store 150. In other embodiments, a certificate authority rather than an application credential store 150 is coupled to the central authentication and validation authority 140.

In the embodiment of FIG. 1, the application API for each application is coupled to the application API for every other application. In other embodiments, the application APIs might not be coupled directly to one another. Instead, each application API might be coupled only to its corresponding security API.

In an example, the J2EE application 110 might wish to send a message requesting information from the CORBA application 120. If it is the first time that the J2EE application 110 has sent a message to one of the other applications in FIG. 1, the security API 114 on the J2EE application 110 sends authentication information about the J2EE application 110 to the central authentication and validation authority 140. In one embodiment, the authentication information is an application ID and a password. In this case, the central authentication and validation authority 140 sends the ID and password to the application credential store 150. The application credential store 150 determines whether the password is valid and returns a response to the central authentication and validation authority 140.

Alternatively, the application credential store 150 can act simply as a repository for application ID and password information. The central authentication and validation authority 140 can request the application ID and password information from the application credential store 150, which then returns the information to the central authentication and validation authority 140. The central authentication and validation authority 140 then makes the determination of whether the password is valid.

In another embodiment, the authentication information from the J2EE application 110 is an X.509 certificate. In this case, the central authentication and validation authority 140 sends the certificate to a certificate authority 160. The certificate authority 160 determines whether the certificate is trusted and whether it has expired or has been revoked. The certificate authority 160 also determines whether the digital signature within the certificate is valid. Based on this review of the certificate, the certificate authority 160 returns a response to the central authentication and validation authority 140 regarding the validity of the certificate.

For the sake of simplicity in the drawing, the system 100 of FIG. 1 is shown with both an application credential store 150 and a certificate authority 160 coupled to the central authentication and validation authority 140. However, while possible for some embodiments, such a configuration would typically not be used in actual practice. The central authentication and validation authority 140 would typically be coupled to an application credential store 150 alone or a certificate authority 160 alone but not to both simultaneously.

If the central authentication and validation authority 140 receives a response from the application credential store 150 or from the certificate authority 160 that the password or the certificate is valid, the central authentication and validation authority 140 creates a token. The token verifies the validity of the application that sent the password or certificate, in this case the J2EE application 110. The central authentication and validation authority 140 then returns the token to the security API 114 of the J2EE application 110. As discussed above, the token can take the form of a string of data placed in an XML document.

Upon the J2EE security API 114 receiving the token, the J2EE application API 112 sends the message to the CORBA application 120 with the token as part of the message payload. The application API 122 on the CORBA application 120 receives the message and the token and extracts the security information from the token. The security API 124 on the CORBA application 120 then sends the security information to the central authentication and validation authority 140 for validation. Validation can include verifying that the central authentication and validation authority 140 created the token and that the token has not expired. The central authentication and validation authority 140 returns its response on the validity of the token to the security API 124 on the CORBA application 120.

If the security API 124 on the CORBA application 120 receives a response confirming that the token is valid, the security API 124 on the CORBA application 120 considers the J2EE application 110 to be authenticated. The application API 122 on the CORBA application 120 then extracts identifying information about the J2EE application 110 from the token. Using this information, the application API 122 on the CORBA application 120 consults a policy server or a rights and permissions table to determine if the J2EE application 110 is authorized to retrieve the information requested by the message. If the J2EE application 110 is authorized, the application API 122 on the CORBA application 120 allows the message to pass from the J2EE application 110 to the CORBA application 120.

If the J2EE application 110 subsequently wished to send a message to the CORBA application 120 or to an MQSeries application 130, it would not have to again go through the process of having its password or certificate authenticated by the central authentication and validation authority 140. Instead, the already-existing token would automatically be sent with the message to the application API on the appropriate application. Upon the application API receiving the token, the security API on the server application would validate the token and the application API would authorize the J2EE application 110 as described above.

In the embodiment where the application APIs are coupled to their corresponding security APIs rather than to each other, an invocation would pass from the application API on a client to the security API on the client and then to the security API on a server, rather than from the application API on the client to the application API on the server as described above.

Figure 2:
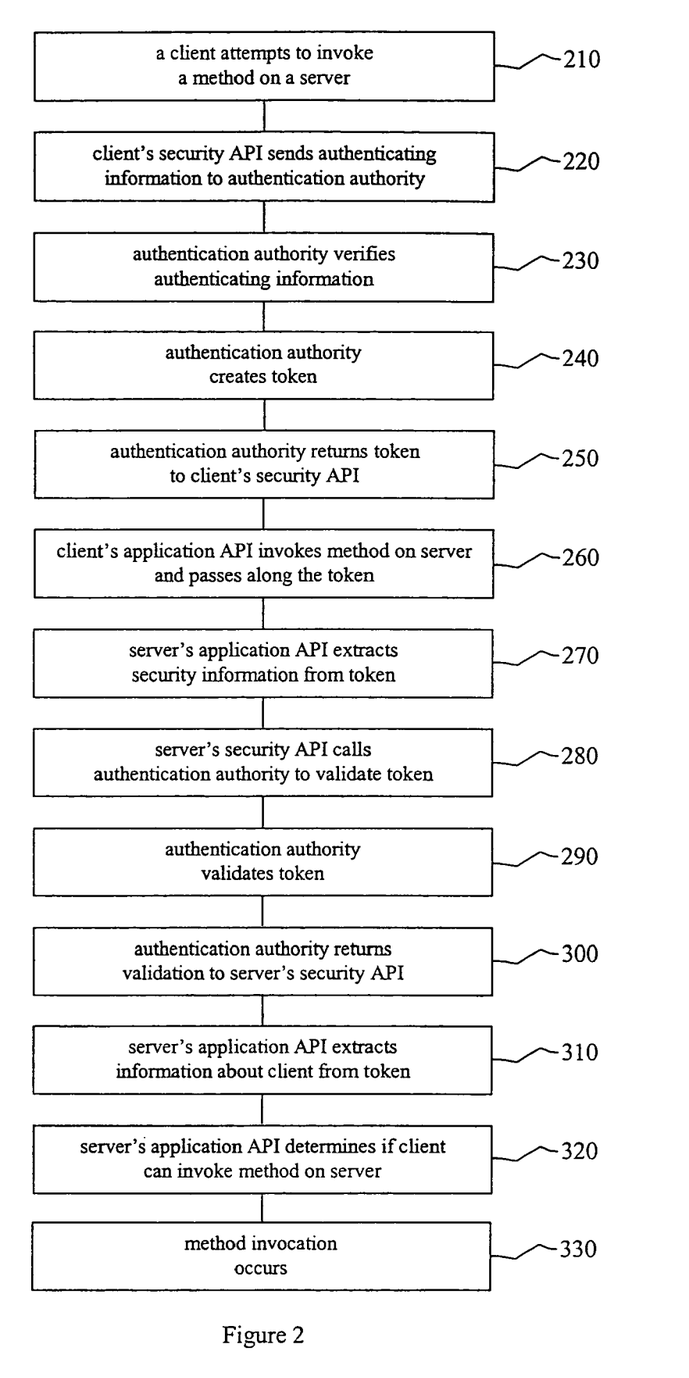
FIG. 2 is a flowchart illustrating operation of the application-to-application security system according to one embodiment.

FIG. 2 illustrates an embodiment of an application-to-application security process. In box 210, a client attempts to invoke a method on a server. In box 220, the security API on the client sends authenticating information about the client to a central authentication and validation authority. The authentication information can take the form of an ID and a password or an X.509 digital certificate.

In box 230, the central authentication and validation authority verifies the authentication information. For an ID and password, an application credential store is consulted to determine if the password is valid. For an X.509 certificate, a certificate authority is consulted to determine if the certificate is trusted, expired, or revoked and if the digital signature is valid. In box 240, if the authentication information is verified, the central authentication and validation authority creates a token. The token can take the form of a string of data in an XML document. The central authentication and validation authority returns the token to the security API on the client in box 250.

In box 260, the application API on the client invokes the method on the server and passes along the token as a parameter of the method. In box 270, the application API on the server extracts the security information from the token. In box 280, the security API on the server calls the central authentication and validation authority to verify that the token is valid. The central authentication and validation authority validates the token in box 290. Validation can include verifying that the central authentication and validation authority created the token, determining whether the token has expired, and other techniques. In box 300, the central authentication and validation authority returns its validation to the security API on the server.

In box 310, if the token is valid, the application API on the server extracts identifying information about the client from the token. Using this information, the application API on the server determines if the client is authorized to perform the requested method invocation in box 320. In box 330, if the client is authorized, the method invocation occurs.

On subsequent invocations by the client, the token would already exist and the steps in boxes 220 through 250 would not need to be repeated. That is, a token would not need to be created again. The existing token would automatically be passed from the client to the server with the method invocation and would be validated by the central authentication and validation authority as indicated in boxes 260 through 300. The steps in boxes 310 through 320 of determining whether the client is authorized to invoke the requested method would then be followed.

In the above embodiments, authentication of a client application occurs when the application first makes a call to a server application. In an alternative embodiment, authentication can occur automatically when an application is first started so that a token will already be available when the application makes its first call.

In the above embodiments, the security API on a server validates the token each time the server receives an invocation containing a token. In an alternative embodiment, the security API on the server might cache information contained in the token. The security API might then consult the cache to validate the token rather than consulting the central authentication and validation authority. In some instances, it may be useful to push a revocation of a token, such as by the authentication authority prompting the revocation or expiration of the token on application and/or security APIs on the client. However, where a security API on a server has cached the token, the authentication authority would also need to notify the security API of the revocation of the cached token.

In a further embodiment, the invocations between clients and servers and the communications between applications and the central authentication and validation authority can be recorded. This can aid in auditing the application-to-application security process.

In a further embodiment, the information in the token can be encrypted. In the case where the token is contained in an XML document, encryption can be achieved through the use of an appropriate XML tag encrypting the data in the token.

In still other embodiments, if an application loses its security credentials (for instance, through the expiration of its digital certificate), the certificate will be revoked, but the token for the application will stay in effect until the token expires. Only a certificate can be revoked, not a token. After the revocation of a certificate, the next time the certificate needs to be reauthenticated the application will be shut down and a new token will not be issued. The risk of leaving a rogue application in use temporarily is balanced by a reduced frequency of reauthentication of a certificate. Alternatively, the frequency of certificate reauthentication could be increased to decrease the amount of time a rogue application and its corresponding token stay in effect.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

What is claimed is:

1. A system to provide application-to-application enterprise security for different applications on different platforms where there is no continuing context or session and a new context is created with new invocations from one of the applications to another, the system comprising:

a first computer comprising a security application program interface and an application program interface coupled to a client application on a first platform, the security application program interface operable to provide a security credential;

an authentication authority receiving the security credential from the security application program interface, the authentication authority further generates a token and communicates the token to the security application program interface where the security credential is valid, wherein the token contains user credentials encoded as a platform and application independent string data type;

a store maintaining data validating the security credential, the store in communication with the authentication authority to validate the security credential, the application program interface coupled to the client application communicating regarding the validity of the token; and a second computer comprising a distinct server application on a second platform to receive the token from the application program interface coupled to the client application, a security application program interface coupled to the distinct server application communicating with the authentication authority to validate the token to enable the client application to use services of the server application, wherein there is no continuing context or session and a new context is created with every invocation of service of the distinct server application by the client application.

2. The system of claim 1, wherein the server application further comprises:

an application program interface to communicate with the application program interface of the client application; and a security application program interface to communicate with the authentication authority.

3. The system of claim 1, wherein the server application caches the token after validating the token with the authentication authority such that when the client application requests service of the server application, via the application program interfaces of the client application, the server application uses the cached token to validate the client application.

4. The system of claim 1, wherein the token generated by the authentication authority comprises a string including at least a portion of the security credential.

5. The system of claim 4, wherein at least a portion of the token is in Extensible Markup Language format.

6. The system of claim 4, wherein at least a portion of the token is in Security Assertion Markup Language format.

7. The system of claim 4, wherein the token includes information related to an expiration date of the token.

8. The system of claim 1, wherein validating the token by the authentication authority includes determining whether the authentication authority created the token.

9. The system of claim 1, wherein the invocation of service is an invocation of a method.

10. A method for providing application-to-application enterprise security for different applications on different platforms where there is no continuing context or session and a new context is created with new invocations from one of the applications to another, the method comprising:
coupling a security application program interface and an application program interface to a client application on a first platform;
communicating a security credential from the security application program interface to an authentication authority;
communicating information related to the security credential between the authentication authority and a data store to determine whether the security credential is valid;
generating a token by the authentication authority when the security credential is valid, wherein the token contains user credentials encoded as a platform and application independent string data type;
communicating the token to a security application program interlace of the client application;
providing, by the application program interface coupled to the client application on the first platform, the token to a distinct server application, the distinct server application on a second platform, wherein there is no continuing context or session and a new context is created with each of a plurality of invocations of service of the distinct server application by the client application; and
communicating, by a security application program interface coupled to the distinct server application, with the authentication authority to validate the token before providing access to services of the distinct server application by the client application.

11. The method of claim 10, wherein the application program interface coupled to the client application communicates the token to an application program interface of the distinct server application.

12. The method of claim 10, wherein validating the token by the distinct server application further comprises:
communicating information related to the token to the authentication authority;
determining, by the authentication authority, whether the token is authentic; and
receiving validation related information from the authentication authority.

13. The method of claim 12, wherein the information related to the token comprises the token itself.

14. The method of claim 12, wherein the information related to the token comprises a portion of data included in the token.

15. The method of claim 12, wherein the authentication authority determines whether the authentication authority generated the token to validate the token.

16. The method of claim 15, wherein the authentication authority determines whether the token has expired.

17. The method of claim 12, wherein the authentication authority determines whether the token has expired.

18. The method of claim 10, wherein the token includes a portion of the security credential in a string format.

19. The method of claim 18, wherein the token includes at least an information related to an expiration date of the token.

20. The method of claim 18, wherein the token is encrypted.

21. The method of claim 18, wherein the string format of the token is further defined as an Extensible Markup Language format.

22. The method of claim 18, wherein the string format of the token is further defined as Security Assertion Markup Language format.

23. The method of claim 10, wherein the client further includes the application program interface coupled to the client application for communicating with the server application and wherein the client further includes the security application program interface coupled to the client application to communicate with the authentication authority.

24. The method of claim 10, wherein the security credential is further defined as including a password and user identification.

25. The method of claim 24, wherein the security credential is further defined as encrypted and the data store is further defined as a data store maintaining user identifications and passwords.

26. The method of claim 10, wherein the security credential is an X.509 certificate and the data store is a certificate authority.

27. The method of claim 26, further comprising:
communicating the X.509 certificate from the authentication authority to the certificate authority;
validating the X.509 certificate by the certificate authority; and
communicating validation information to the authentication authority.

28. A system to provide application-to-application enterprise security for different applications on different platforms where there is no continuing context or session and a new context is created with new invocations from one of the applications to another, the system comprising:
a first computer comprising a first application program interface coupled to a first application on a first platform and a first security application program interface coupled to the first application on the first platform, to provide a first security credential;
a first security application program interface coupled to the first application on the first platform, to provide a first security credential;
a second computer comprising a second application program interface coupled to a second application on a second platform and a second security application program interface coupled to the second application on the second platform, to provide a second security credential;
an authentication authority receiving the first and second security credentials from the first and second security application program interfaces, the authentication authority further generating tokens and communicating the tokens to the first and second security application program interfaces where the first and second security credentials are valid, wherein the tokens contain user credentials encoded as a platform and application independent string data type, wherein the tokens generated by the authentication authority are further defined as a first token generated by the authentication authority for the first application based on the first security credential and a second token generated by the authentication authority for the second application based on the second security credential;

a store maintaining data validating the first and second security credentials, the store in communication with the authentication authority to validate the first and second security credentials;

the first application program interface communicating regarding tokens; and the second application program interface receiving the first token from the first application program interface, wherein there is no continuing context or session and a new context is created with each invocation of the second application program interface by the first application program interface, the second security application program interface communicating with the authentication authority to validate the first token to enable the first application to use services of the second application and wherein the first application program interface receives the second token from the second application program interface, wherein there is no continuing context or session and a new context is created with each invocation of the first application program interface by the second application program interface, the first security application program interface communicating with the authentication authority to validate the second token to enable the second application to use services of the first application.

29. The system of claim 28, wherein the first and second tokens are further defined as data provided in a string format including at least portions of the first and second security credentials, respectively.

30. The system of claim 29, wherein the first and second tokens include an expiration date.

31. The system of claim 29, wherein the string format of the first and second tokens is further defined as Extensible Markup Language Format.

32. The system of claim 29, wherein the string format of the first and second tokens is further defined as Security Assertion Markup Language Format.

* * * * *